(12) United States Patent
Ross

(10) Patent No.: US 6,483,847 B1
(45) Date of Patent: *Nov. 19, 2002

(54) ARBITRATION SCHEME FOR A SERIAL INTERFACE

(75) Inventor: Kevin Ross, Sunnyvale, CA (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,634

(22) Filed: Dec. 1, 1998

(51) Int. Cl.[7] .................................. H04L 12/413
(52) U.S. Cl. ........................... 370/445; 370/448
(58) Field of Search ........................... 370/445, 446, 370/447, 448, 431, 230, 238, 389

(56) References Cited

U.S. PATENT DOCUMENTS

| | | | | |
|---|---|---|---|---|
| 4,412,326 A | * | 10/1983 | Limb | 370/448 |
| 4,506,361 A | * | 3/1985 | Kume | 370/448 |
| 4,586,176 A | * | 4/1986 | Miyao | 370/352 |
| 4,701,909 A | * | 10/1987 | Kavehard et al. | 370/446 |
| 5,365,509 A | * | 11/1994 | Walsh | 370/445 |
| 5,398,243 A | | 3/1995 | Aguilhon | 370/85.6 |
| 5,453,987 A | * | 9/1995 | Tran | 370/447 |
| 5,535,211 A | * | 7/1996 | Yano | 370/447 |
| 5,664,105 A | * | 9/1997 | Keisling et al. | 709/224 |
| 5,699,515 A | * | 12/1997 | Berkema et al. | 370/448 |
| 5,982,779 A | * | 11/1999 | Krishnakumar et al. | 370/447 |
| 6,172,983 B1 | * | 1/2001 | Shaffer et al. | 370/446 |
| 6,256,317 B1 | * | 7/2001 | Holloway et al. | 370/447 |

FOREIGN PATENT DOCUMENTS

| | | | | |
|---|---|---|---|---|
| EP | 0049917b1 | 9/1981 | ........... | G06F/13/00 |
| EP | 0132645 A2 | 2/1985 | ........... | H04L/11/16 |

OTHER PUBLICATIONS

"Multi–Access Medium Capture By Preamble Technique"; IBM Tech. Discl. Bulletin, vol. 22, No. 8A, pp. 3364–3366, Jan. 1980.

"Random Access Switched Local Computer Network with Priority Function" Iida et al, National Telecommunications Conference, New York, IEEE pp. 37401–37406.

"Ethernet and the PBX—A Beneficial Partnership" V. Coleman, Computer Design Pennwell Publishers, vol. 21, No. 9, Sep. 19892, p. 183–184,, 186, 188.

* cited by examiner

*Primary Examiner*—Ricky Ngo
*Assistant Examiner*—Phuc Tran
(74) *Attorney, Agent, or Firm*—John Vodopia

(57) ABSTRACT

To minimize the time and resources typically associated with collision detection in a single channel communications system, this invention provides a method and apparatus for a collision based protocol that assures that one device in the system always wins a collision conflict. A device in accordance with this invention that is assured of always winning a collision conflict need not contain a collision detector, nor the storage resources typically used to buffer the effects of a collision. The device is also always assured of continuous transmission access once its transmission begins. This continuous transmission access is particularly well suited for high speed data access devices such as magnetic disks, laser discs, and the like, that access data continually as the disk passes by their read heads.

8 Claims, 6 Drawing Sheets

ARBITRATION SCHEME FOR A SERIAL INTERFACE

BACKGROUND OF THE INVENTION

1. Field of the Invention

This invention relates to the field of communications, and in particular to the field of data communications between a host device and a peripheral device via a serial interface.

2. Description of Related Art

The use of a serial interface between components is often preferable to a parallel interface. The use of a serial interface for communicating the data can provide for significant cost savings. The cost of the media to carry the serial information is less than that of a parallel interface. If a wired connection is used, fewer wires are required between the devices; if a wireless connection is used, fewer channels are required between the devices. The communicating devices will also be less costly because the interconnection ports, such as pads on an integrated circuit or pins on a printed circuit board, are often more costly than the circuitry required to convert data between parallel and serial forms. And, particularly in integrated circuit design, the number of available interconnection ports is often a fixed constraint, from both a cost and feasibility viewpoint. Typically, to achieve the benefits of a serial interface, a single channel communications path is allocated for communications to and from each device.

Compared to a parallel interface, however, a serial interface imposes limitations. The parallel interface is inherently faster than a serial interface, because multiple bits of the information in a parallel interface are transmitted simultaneously. In certain very high speed applications, on the other hand, the delay skew among pins of a parallel interface is problematic, and a very high speed serial interface is preferred. To be competitive, a serial interface must typically operate at the high end of the feasibility spectrum with regard to speed. That is, for example, if the interface must provide at an 8 megabit per second throughput, an 8 bit parallel interface could be designed with 8 interconnections, or channels, each operating at 1 megabit. The serial interface, on the other hand, must be designed with an interconnection channel that operates at 8 megabits per second. Because of the typically higher required interconnection speed, serial interfaces are limited with regard to design options that may be available at lower speeds.

A common protocol that is used for single channel communications is a "collision avoidance" protocol. When a device has information to send, it waits for a quiet period on the communications channel, then broadcasts its information. By waiting until the channel is unused before communicating, one device does not purposely interfere with another device that is already using the single communications channel. However, in this protocol, it is possible that two devices may each monitor the channel, detect a quiet period, and then each start their respective transmission on the single channel. Two (or more) simultaneous transmissions on a single channel is termed a "collision", and neither transmission will be recoverable at their intended receiver. To compensate for the likelihood of collisions, typical protocols provide for a collision recovery scheme. Traditionally, the protocol requires that each transmitter monitor the channel to detect a collision and take appropriate action when a collision is detected. Typically, the appropriate action is to cease transmission (commonly termed "back off"), then recommence transmission at the next detected quiet period. To avoid repeated collisions between the same devices after a collision, the protocol typically requires that each device attempt a retransmission after a random duration of the quiet period. In this manner, the device having the shorter random duration will commence transmission and the device with the longer random duration will detect this transmission and wait until the next quiet period.

Collision detection is a somewhat complex process, because the transmission of information from one device will typically interfere with the reception of a possible transmission from another device over the same channel. In general, collision detection requires that the transmitter transmit a signal that can be overwhelmed by a transmission from another device. For example, the transmitter may "transmit" a high-impedance state, by transmitting neither a logic high value, nor a logic low value. The transmitting device monitors the communications channel during the duration of the high-impedance state. If this transmitter is the only transmitter communicating on the communications channel, the communications channel will remain in a high-impedance state or drift to a known logic state. If, on the other hand, another transmitter is transmitting on this channel, the communications channel will change state in response to the other transmission. When the transmitting device detects the changing state, it declares a collision, backs off, and attempts a retransmission at the next quiet period. In like manner, because a collision corrupts the transmission of each device, the other transmitting device is also configured to monitor for collisions, and backs off when the collision is detected. As is evident to one of ordinary skill in the art, the collision detection—back off—retransmit scenario introduces throughput delays, and the likelihood of collisions and their adverse effects of throughput become multiplicative as the volume of traffic over the channels increase, because of the repeated retransmissions after each collision.

The collision detection—back off—retransmit scenario is particularly problematic to high speed peripheral devices such as magnetic disks, CDs, and the like. Typically, the peripheral has access to the data at particular times, such as when the appropriate area of a spinning disk is under the read head of the device. If the data cannot be communicated when the data is available for access, the peripheral device must contain a storage buffer to hold the data until it can be transmitted, or loose a revolution thereby reducing the transfer rate. Additional collisions, or additional delays incurred while awaiting a retransmission opportunity, will require additional storage buffers, or a cessation of data access until buffer space becomes available. Also, because of the random nature of collisions and the aforementioned dependency on traffic volume, it is difficult to assure a given throughput without providing an overabundance of storage. That is, to assure a given throughput regardless of the impact of collisions, the amount of storage provided must be sufficient to buffer the effects of the worst-case collision scenario; consequently, during normal operations, with average occurrences of collisions, most of the storage provided for collision compensation will be unused.

BRIEF DESCRIPTION OF THE INVENTION

It is an object of this invention to provide a method and apparatus for serial communications that has a throughput that is independent of the likelihood of collisions. It is a further object of this invention to eliminate the need for collision detection in a peripheral device. It is a further object of this invention to minimize the need for storage buffers in the peripheral device.

These objects and others are achieved by providing a collision based protocol that assures that one device in a network always "wins" a collision conflict. A device in accordance with this invention that is assured of always winning a collision conflict need not contain a collision detector, nor the storage resources typically used to buffer the effects of a collision.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
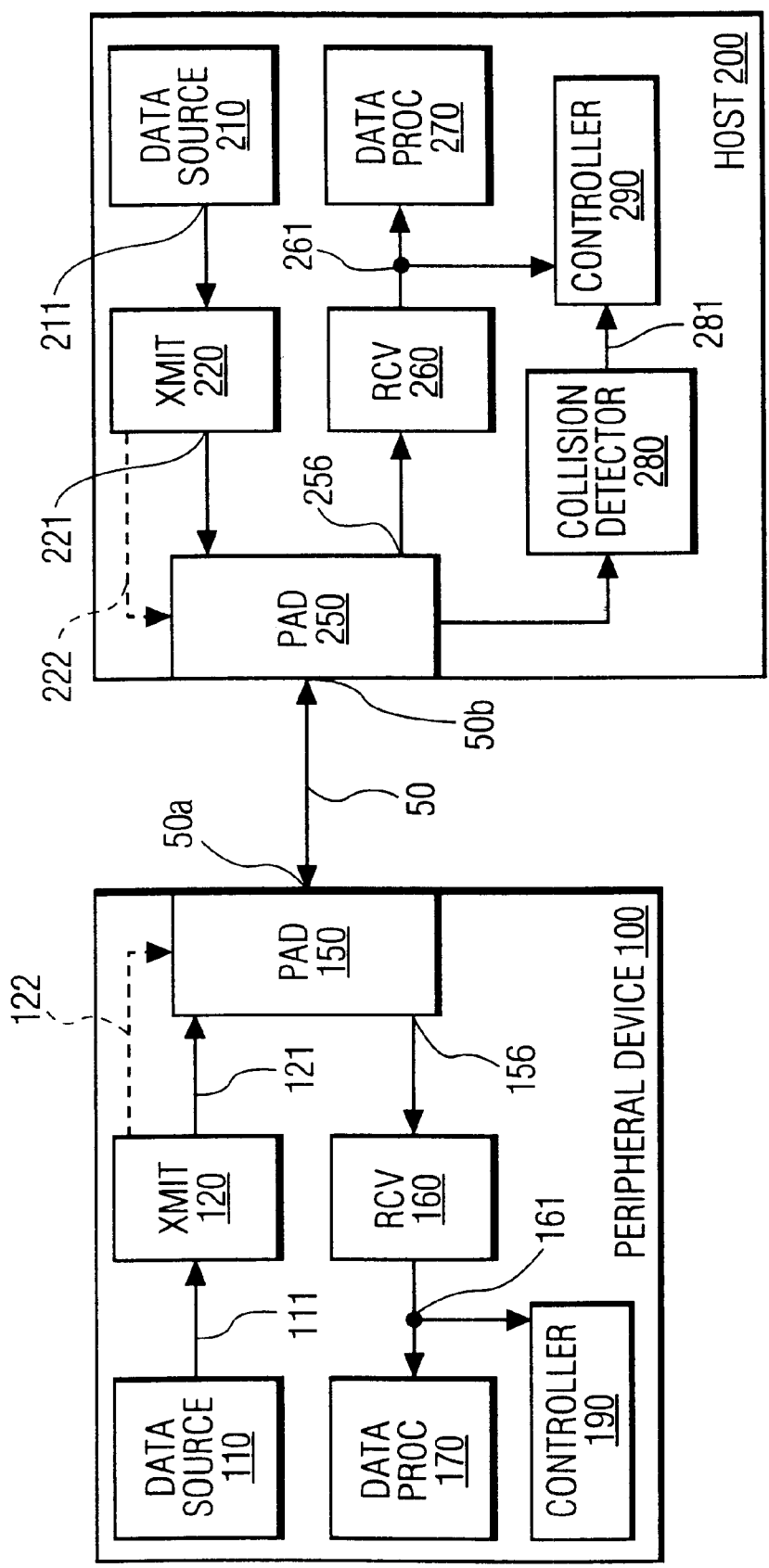
FIG. 1 illustrates an example block diagram of a serial communications system in accordance with this invention.

FIG. 1 illustrates an example block diagram of a serial communications system in accordance with this invention. Illustrated in this system is a peripheral device 100 and a host device 200 that communicate with each other via a single channel communications path 50. Typically, resources such as control circuitry and storage are at a premium in a peripheral computer device such as a disk drive, as compared to the resources available on the host computer to which the peripheral is connected. For ease of understanding, this invention is presented using this host-peripheral paradigm. It will be evident to one of ordinary art, however, that the principles presented herein can be applied to communicating devices in general that use a common communications path for transmitting and receiving.

The single channel communications path 50 may be via a wired or wireless communications media or combinations of media. The single channel communications path 50, as its name implies, is limited to transmissions from only one device at any point in time. Multiple signals may be transmitted simultaneously via this communications path 50, such as clock and data signals on separate wires, but from only one device at a time. In the illustrated system of FIG. 1, if both devices 100, 200 attempt to transmit during the same time interval, neither device 100, 200 will be able to correctly receive the transmitted information from the other during that time interval.

The example peripheral device 100 of FIG. 1 includes a data source 110 and a transmitter 120 for communicating data 111 from the source 110 to the host device 200. The transmitter 120 also effects any transformations of the data required for transmission, such as conversion from parallel to serial form, conversion to a modulated form, and the like. The transformed data 121 from the transmitter 120 is communicated as a peripheral transmission signal via a pad 150, for example an input/output pad of an integrated circuit. As would be evident to one of ordinary skill in the art, if the communications path 50 is via a wireless media, the pad 150 represents the components used to effect the transmission via this media, such as an RF antenna, a sonic transducer, an infrared transducer, and the like. Illustrated in FIG. 1 is an optional transmit-disable signal 122 that is used in a preferred embodiment to isolate the transmitter 120 from the receiver 160 when signals are being received from the host 200.

The example host device 200 of FIG. 1 includes a corresponding pad 250 that receives the peripheral transmission signal corresponding to the transformed data 121 and provides a received signal 256 to a receiver 260. The pad 250 and receiver 260 effect a transformation of the peripheral transmission signal on path 50 into data 261 that corresponds to the original data 111. For example, if the communications path 50 is via an RF transmission, the pad 250 and receiver 260 receive the RF modulation of the original data 111 and demodulate it to form the data 261. The data 261 is provided to the data processor 270 for subsequent processing, for example for processing by an application program that is executing on the host device 200. The example host device 200 includes a collision detector 280, which detects collisions on the communications path 50, as discussed further herein. The host device 200 also includes an optional transmit-disable signal 222 that is used in a preferred embodiment to isolate the transmitter 220 from the receiver 160 when signals are being received from the host 200, and to isolate the transmitter 220 as required by the collision detector 280.

In like manner, the example host device 200 also includes a data source 210 and a transmitter 220 for communicating data 211 from the source 210 to the peripheral device 100. The transmitter 220 transforms the data 211 to a form 221 suitable for transmission, as discussed above with regard to transmitter 120. The transformed data 221 from the transmitter 220 is communicated as a host transmission signal via a pad 250. Correspondingly, the example peripheral device 100 receives the host transmission signal via the pad 150 and provides a received signal 156 to a receiver 160. The pad 150 and receiver 160 effect a transformation of the host transmission signal into data 161 that corresponds to the host data 211. In the example of the peripheral device 100 being a disk drive, the data processor 170 may merely store the data 161 from the receiver 160 to the data source 110 for subsequent access as data 111.

Figure 2A:
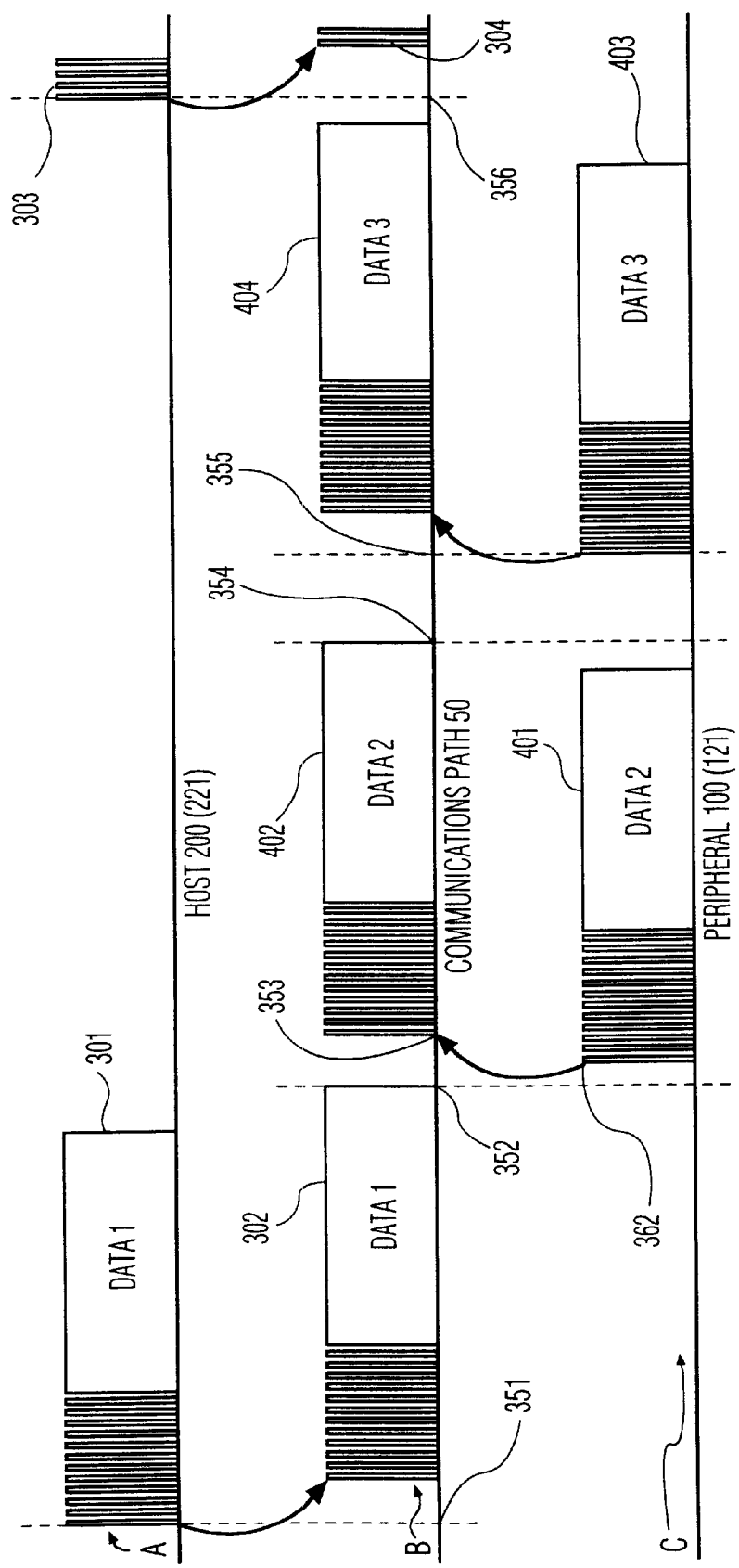
FIG. 2 illustrates example timing diagrams of a serial communications system in accordance with this invention.
Figure 2B:
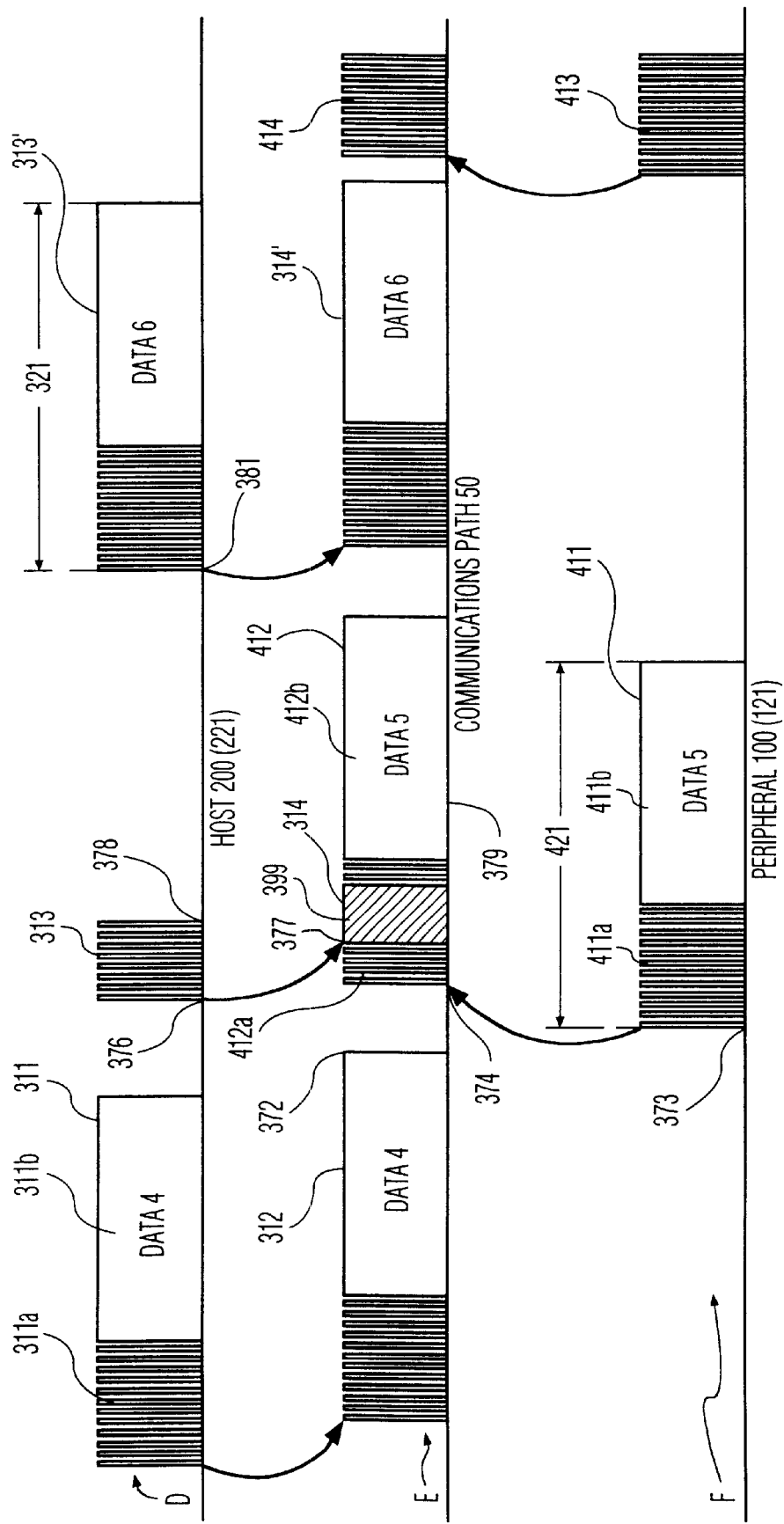

The peripheral device 100 includes a controller 190 and the host device 200 includes a controller 290, the operation of which are best understood with respect to the timing diagrams of FIG. 2. FIG. 2A illustrates transmissions 301, 303 from the host 200 and transmissions 401, 403 from the peripheral 100 via the communications path 50 without collision. FIG. 2B illustrates transmissions 311, 313 from the host 200 and transmissions 411, 413 from the peripheral 100 via the communications path 50 with a collision 399.

Timing diagram A of FIG. 2A illustrates two transmissions 301, 303 from the host device 200, corresponding to the signal node 221 of FIG. 1. Timing diagram B illustrates corresponding host transmissions 302, 304 on the communications path 50. The controller 290 in the host 200 commences the transmission 301 at a time 351 that the communications path 50 is clear of other transmissions. Not shown, the transmission 302 is thereafter detected by the receiver 160 in the peripheral device 100, and subsequently processed by the data processor 170. During this reception of the data 302 from the host, the controller 190 prevents transmissions 121 from the transmitter 120. At the end 352 of the host transmission 302, when the communications path 50 is again clear, the controller 190 in the peripheral device 100 allows the transmitter 120 to transmit the transmission

401, as illustrated in timing diagram C of FIG. 2A, corresponding to signal node 121 of FIG. 1. The transmission 401 forms the peripheral transmission 402 on the communications path 50. Similarly, at a time 355 after the end 354 of the peripheral transmission 402, while the communications path 50 is clear, the controller 190 allows the transmitter 120 to transmit another transmission, 403, as peripheral transmission 404 on communications path 50. Thereafter, at another clear interval 356 of the communications path 50, the controller 290 in the host 200 allows the transmitter 220 to transmit the transmission 303 as host transmission 304 on the communications path 50. This process continues, each device 100, 200 waiting for a quiet period on the communications path 50 to commence transmission.

As illustrated in FIG. 2A, there are finite time delays between, for example, the times 352 when the host transmission 302 ends, the time 362 when the transmission 401 at the peripheral 100 commences, and the time 353 when the peripheral signal 402 appears on the communications path 50. Not shown, there is also a finite delay between when the peripheral signal 402 appears on the communications path 50 and when this peripheral signal 402 is detected by the receiver 260 of the host device 200. During this entire delay interval, from time the host transmission 302 ends and the time that the peripheral signal 402 is detected by the receiver 260, the host device 200 is unaware that the peripheral device 100 has commenced transmission 401.

Illustrated in FIG. 2B is a collision 399 that can result because of the delay between the commencement of a transmission 411 at the peripheral 100 and the detection of the corresponding peripheral transmission 412 at the host 200. Illustrated in timing diagram F of FIG. 2B, the peripheral device 100 commences a transmission 411 at a time 373 after the end 372 of the host transmission 312. The transmission 411 appears on the communications path 50 as peripheral transmission 412 at time 374. During this time, the controller 290 at the host 200 is unaware of the commencement of the transmission 411 at the peripheral device 100. As such, the controller 290 allows the transmitter 220 to commence a transmission 313 at time 376, which appears on the communications path 50 as host transmission 314 at time 377, as illustrated on timing diagrams D and E of FIG. 2B. The times 376, 377 may occur before or after times 373, 374, respectively, and are illustrated as occurring after times 373, 374 in FIG. 2B. When both the host transmission 314 and the peripheral transmission 412 appear on the single channel communications path 50, a collision 399 occurs. For as long as both transmissions 314, 412 appear on the single channel communications path 50, the collision 399 continues, and both transmissions 314 and 412 are corrupted by each other, as illustrated by the hashed lines of FIG. 2B.

In accordance with this invention, the collision detector 280 in the host device 200 detects the collision 399, and in response thereto, the controller 290 terminates the transmission 313 at time 378, before the duration 321 required to send the entire intended host transmission 313. The collision 399 is ended on the communications path 50 at time 379 by the corresponding termination of the host transmission 314. At some time 381 later, during the next quiet period of the communications path 50, the controller 290 allows the transmitter 220 to retransmit the transmission 313 for its entire intended duration 321, illustrated in FIG. 2B as transmission 313', and corresponding host transmission 314'. Thereafter, the process continues, as illustrated by the transmission 413 from the peripheral device 100 and corresponding peripheral transmission 414 on the communications path 50.

In accordance with this invention, the peripheral device 100 does not terminate its transmission 411 when the collision occurs. That is, each peripheral transmission has a intended duration 421, the time required to transmit the intended transmission 411. Once the peripheral device 100 commences a transmission, the transmission continues uninterrupted for this entire intended duration 421, even though collisions are likely to occur on the single channel communications path 50. This continued transmission is particularly beneficial to devices that provide time dependent data, such as magnetic disk drives, magnetic tape drives, CD drives, video disc drives, and the like. In such devices, data is accessed only when the reading mechanism passes over the area of the media that contains the data. In these devices, by providing an assured continuous transmission once the transmission starts, the data read from the media can be transmitted directly, thereby minimizing the need for data buffers within the device. That is, if a read of data from the media commences when the single channel communications path 50 is clear, contiguous data elements on the media can be continuously transmitted as the read head passes over them, without concern for collision interference.

Assuming an equal packet size for transmissions from the host 200 and the peripheral 100, this uninterrupted transmission scenario also assures a throughput from the peripheral of at least one half the bandwidth of the communications path 50, less the overhead associated with this scenario, regardless of the likelihood of collisions. That is, given the bandwidth of the communications path and the overhead associated with this protocol, the throughput of the peripheral can be determined without regard to the likelihood of collisions. Because the throughput is independent of collisions, the ancillary components typically required of a device that sends information via a single channel communications path, such as collision detectors, collision buffers, retransmission means, and the like, are not required in a peripheral implemented in accordance with this invention.

Note that during the collision period 399, the host transmission 314 and peripheral transmission 412 are corrupted by each other. The corruption of the host transmission 314 during the collision period 399 is of no consequence, because the host transmission 314 is retransmitted as host transmission 314'. The corruption of the peripheral transmission 412, however, is permanent, because the peripheral device 100 is unaware of the collision, and the transmission 412 is not retransmitted. In accordance with this invention, each peripheral transmission includes a preamble and a data stream, as illustrated in FIG. 2B as preamble 412a and data stream 412b of peripheral transmission 412. The preamble 412a contains no information, or information that can be recovered after corruption, whereas the data stream 412b contains the information that cannot be recovered except by a retransmission of the data stream 412b. For example, the corresponding transmission 411 contains a preamble 411a that is appended to the data 111 from the data source 110 by the transmitter 120, the data stream 411b corresponding to the data 111. The appended preamble 41 1a may be a predefined sequence, a random sequence, or a sequence that contains, for example, diagnostic information related to the peripheral device 100. Because such diagnostic information will typically be repeated in other preambles, the loss of this information because of a collision is deemed insignificant, and does not require a retransmission of transmission 411. In a preferred embodiment of this invention, the preamble is structure so as to be quickly detectable by the host device 200, thereby reducing the required length of the preamble, as discussed below.

The time duration of the peripheral preamble period 411a, and corresponding period 412a, must be sufficiently long to assure that the host transmission 314 is removed from the single channel communications path 50 before the data stream 412b appears on the single channel communications path 50.

Figure 3:
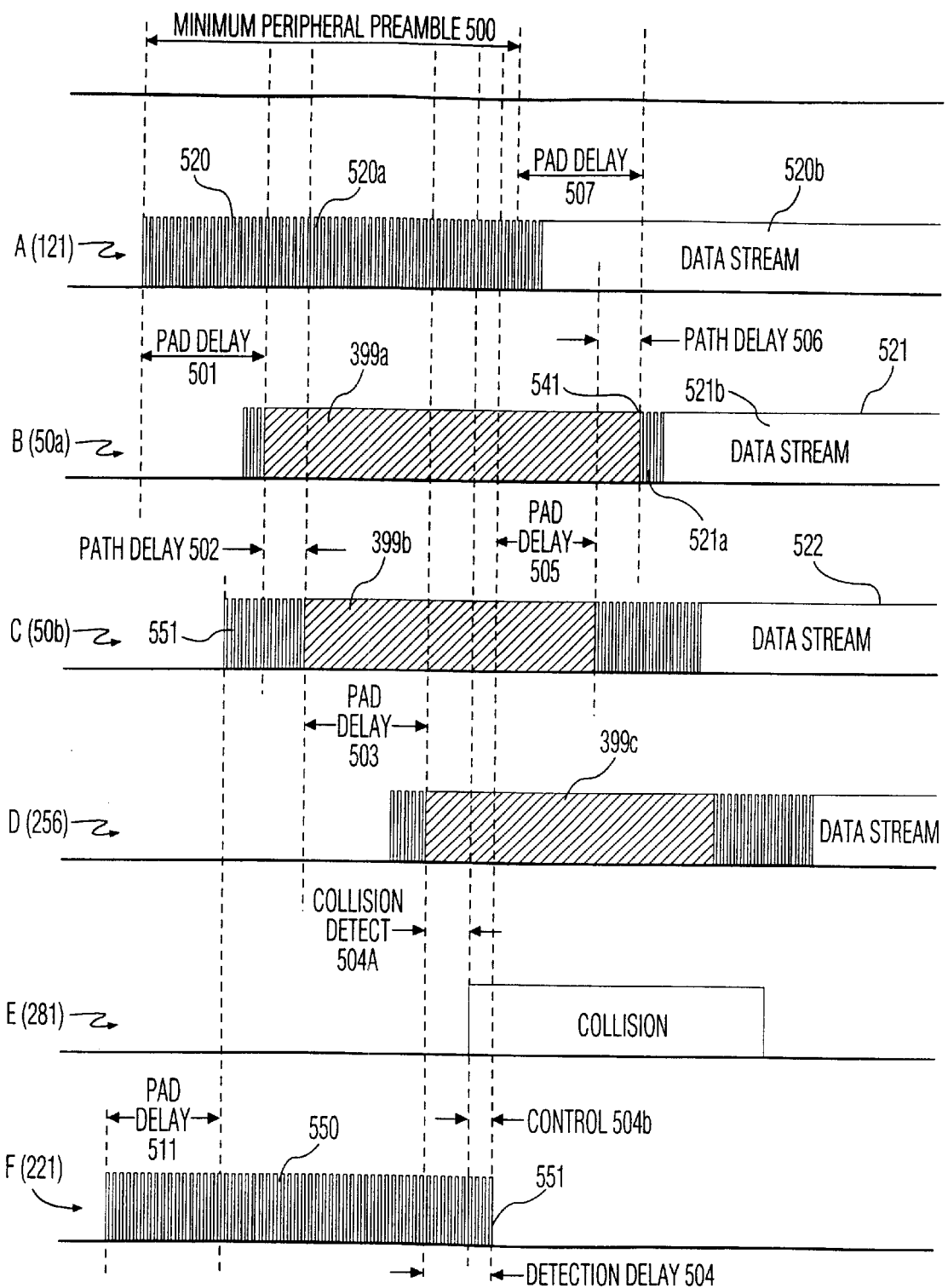
FIG. 3 illustrates example timing diagrams of a peripheral transmission in accordance with this invention.

FIG. 3 illustrates example timing diagrams for determining the required duration of the peripheral preamble period. Timing diagrams A, D, E, and F of FIG. 3 represent signals on signal nodes 121, 256, 281, and 221 of FIG. 1 respectively. Timing diagrams B and C represent signals on the communications path 50, wherein the signals at either end 50a, 50b of the communications path 50 have a time skew because of the time required for signals to traverse the path 50. Referring to timing diagrams A and B of FIG. 3, a transmission 520 on node 121 appears as a peripheral transmission 521 at the communications path 50a after a pad delay 501. The pad delay 501 is the delay associated with propagating an output on the pad 150. The peripheral transmission 521 at 50a is propagated to the opposite end 50b of the communications path 50 after a path delay 502, as peripheral transmission 522. The peripheral transmission 522 at 50b is propagated to the receiver 260 and collision detector 280 after a pad delay 503 that is the delay associated with propagating an input on the pad 250.

Timing diagram F illustrates a transmission 550 from the transmitter 220 of the host device 200 which appears as host transmission 551 at the host end 50b of the communications path 50 after a pad delay 511. In the example of FIG. 3, the host transmission 550 is assumed to be present on the communications path 50 before the peripheral transmission 521. When the peripheral transmission 521 appears at peripheral end 50a of the communications path 50, a collision 399a occurs. This collision 399a is propagated to the host end 50b of the communications path 50b, illustrated as collision 399b. The collision 399b propagates to the collision detector 280 after a pad delay 503. Delay time 504a represents the time required for the collision detector 280 to detect the collision 399c, and delay time 504b represents the time required for the control 290 to terminate the transmission 550. Because the control delay 504b is typically much shorter than the time 504a required for the collision detector 280 to detect the collision, a single collision detection delay 504 term is used to indicate both the detection of the collision and corresponding termination of transmissions. Note that the collision detection delay 504, discussed below, is determined using a worst case scenario, for example when the transmission 550 occurs just prior to the time that the host 200 recognizes that the peripheral device 100 is transmitting. The termination of transmission 550 at time 551 results is a cessation of the collision 399b at the host end 50b of the communications path 50 after a pad delay 505 that is equal to the aforementioned pad delay 511. Correspondingly, the collision 339a ceases 541 after a path delay 506 from the host end 50b of the communications path 50 to the peripheral end 50a, as illustrated on timing diagram B of FIG. 3.

In accordance with this invention, the preamble 521a of the peripheral transmission 521 does not end before the cessation 541 of collision 339a at the peripheral end 50a of the communications path 50. Therefore, the preamble 520a of the transmission 520 does not end before one pad delay 507 before the cessation 541 of the collision 339a. Thus, using D(x) to represent the delay associated with the referenced durations x (500–507) of FIG.3, the minimum peripheral preamble duration 500 is equal to:

$$D(500)=D(501)+D(502)+D(503)+D(504)+D(505)+D(506)-D(507). \quad (1)$$

D(507) is the delay associated with the propagation of an output on the pad 150, and is equal to D(501), the aforementioned pad delay 501. Thus, the minimum peripheral preamble duration is:

$$D(500)=D(502)+D(503)+D(504)+D(505)+D(506). \quad (2)$$

In a typical environment, the pad delays 501, 503, 505 are substantially equal, as are the path delays 502 and 506. Thus, in such an environment, the minimum peripheral preamble duration is:

$$D(500)=2*(\text{Pad delay}+\text{Path delay})+D(504). \quad (3)$$

In a preferred environment, wherein the peripheral is a high speed data access device that communicates with a host computer, the path delay is substantially less than the pad delay 501, 503, 505 and the detection delay 504. Therefore, in the preferred environment, the preferred peripheral preamble duration can be approximated as:

Peripheral preamble duration $\geq 2*$ Pad delay+Collision detection delay. (4)

Figure 4:
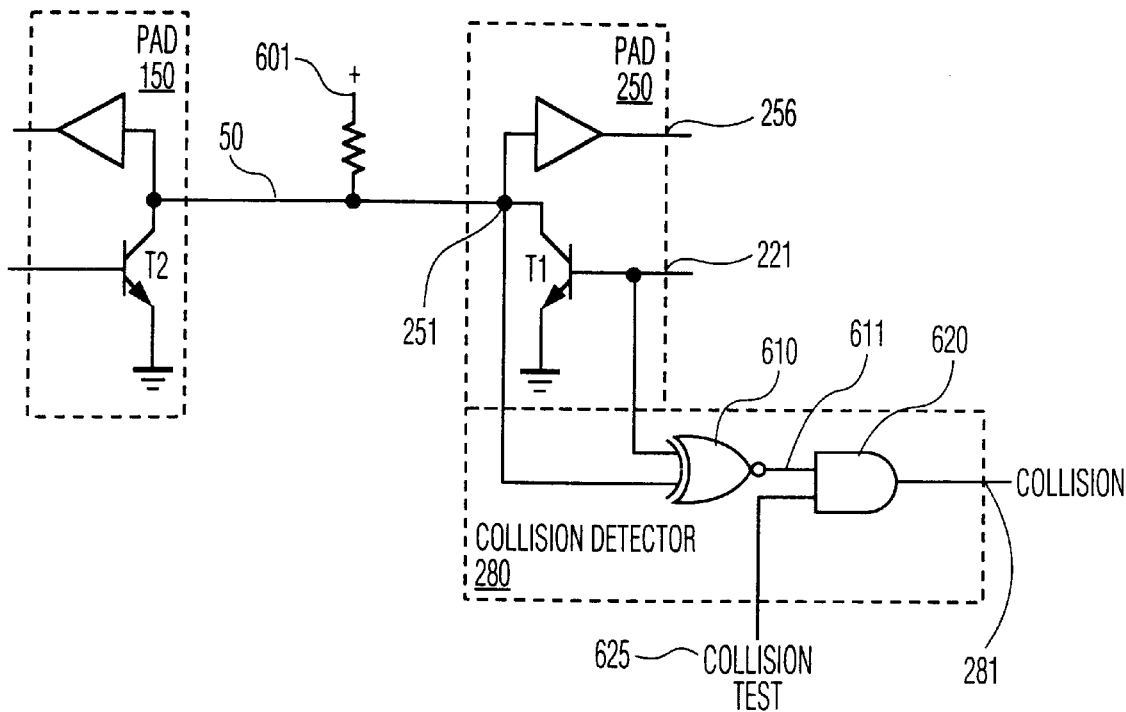
FIG. 4 illustrates an example block diagram of a collision detector in accordance with this invention.

The collision detection delay time 504 is dependent on the means employed to detect a collision. Collision detection techniques are common in the art. Typically, collision detection is effected by monitoring the communications path when the device transmitter is placed in an inactive state that can be overwhelmed by a transmission from another device, such as a high-impedance state. FIG. 4 illustrates an example implementation of a collision detector 280 that includes a high impedance state during data transmissions, and FIG. 5 illustrates an example implementation of a collision detector 280 with a high impedance state that is independent of the data states.

In FIG. 4, transistors T1 and T2 are configured as a conventional open collector pull-down transistors. When the input signal 221 is high, the transistor T1 turns on, pulling the voltage at node 251 low. When the input signal 221 is low, the transistor T1 turns off, and the voltage at node 251 is dependent upon the state of transistor T2. If the transistor T2 is also turned off, the voltage at node 251 will be pulled high by the positive voltage source 601. In this example embodiment, all inactive devices, that is devices that are not transmitting, are configured to have their output transistors T1, T2 turned off. The exclusive-nor gate 610 effects a comparison between the logic levels at the input 221 and output 251 of the transistor T1. During normal operations, transistor T1 effects an inversion of the input 221; the exclusive-nor gate 610 asserts a high logic value at its output 611 when the input 221 and output 251 are the same, indicating a possible collision. Note that while the transistor T1 is undergoing a transition, the exclusive-nor gate 610 will likely indicate a possible collision, due to the aforementioned delay 511 associated with propagating an output of the pad 250. The collision test signal 625 is asserted only after the transistor T1 is no longer in a transition state. The and gate 620 provides the collision signal 281 which is asserted whenever the input 221 and output 251 of the transistor T I are the same and the collision test signal 625 is asserted.

Figure 5:
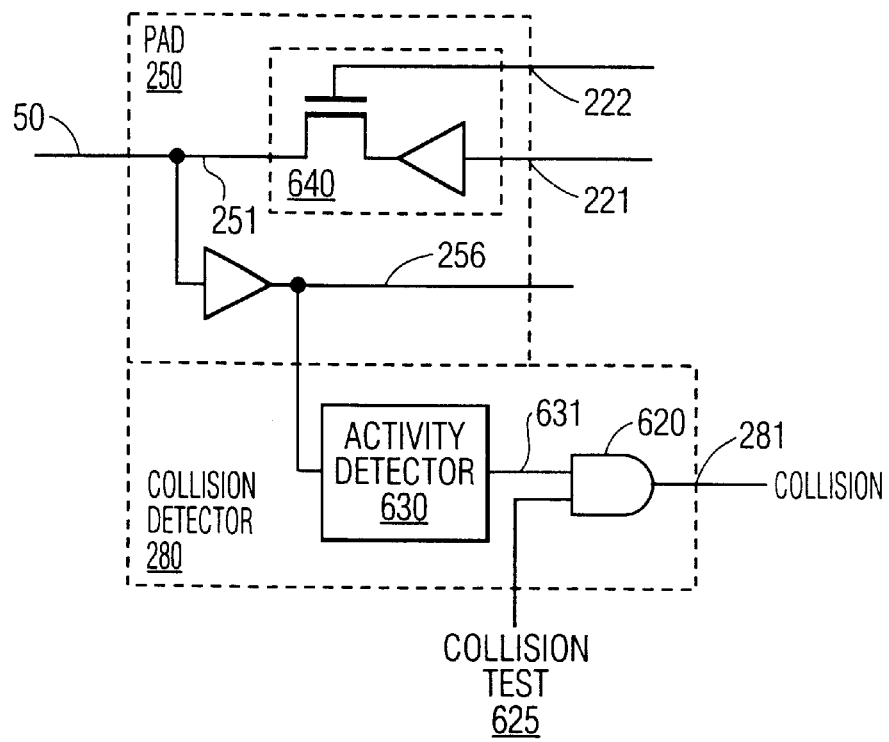
FIG. 5 illustrates an example block diagram of an alternative collision detector in accordance with this invention.

In FIG. 5, a tri-state buffer 640 places the node 251 in a high-impedance state whenever a control signal 222 is asserted. Illustrated in FIG. 5 is an activity detector 630 that provides an activity signal 631 whenever a valid input sequence occurs at node 256. Such a detector 630 is common in the art and is used, for example, to alert the host or peripheral that data is arriving. The activity signal 631 is gated with the collision test signal 625 via an and gate 620 that asserts a collision signal 281 whenever activity is detected while the collision test signal 625 is asserted. After asserting the high impedance state on node 251, the collision test signal 265 is not asserted until after the delay associated with the propagation of the signal 251 through the pad 250 and the activity detector 630.

Using the example collision detectors 280 of FIGS. 4 and 5, it can thus be seen that the collision detection time is at least as great as the time to apply a high impedance state plus the pad delay. That is, in these example embodiments, collisions are detected some finite time after the output pad 250 is placed in a high-impedance state.

The example output pad 250 of FIG. 4 is brought to a high impedance state every time the node 221 is brought low. That is, in effect, the high-impedance state is contained within the states of the data. If a return-to-zero format is used for transmissions, a high impedance state is assured at every period of the transmission. Thus, the aforementioned minimum collision detection time the period of the transmission plus a pad delay. As is commonly known to one of ordinary skill in the art, however, the example output pad 250 of FIG. 4 has a limited transmission speed, due to the reliance on a passive pull-up to bring the node 251 to a high voltage state. If higher speed operation is required, a configuration similar to FIG. 5, discussed below, is preferred.

FIG. 5 illustrates an explicit control 222 for placing the pad 250 into a high-impedance state. As noted above, high speed circuits require high speed transitions, which are typically effected by low impedance devices. In a preferred embodiment of a host device 200 for high speed communications, the pad 250 is brought to a high-impedance state infrequently, thereby allowing high-speed throughput predominantly.

In a preferred embodiment of this invention, each host transmission includes a preamble, as illustrated for example by preamble 311a and data stream 311b of transmission 311 in FIG. 2B. In accordance with one aspect of this invention, the high-impedance state occurs at the end of the preamble 311a, and is structured such that the subsequent data stream 311b can be transmitted at the high speed, without concern for collisions. That is, once the host commences the transmission of the data stream portion of each transmission, the transmission of the data stream will continue without interruption. This embodiment eliminates the reduction of speed typically caused by repeated collision checks during data transmissions.

Figure 6:
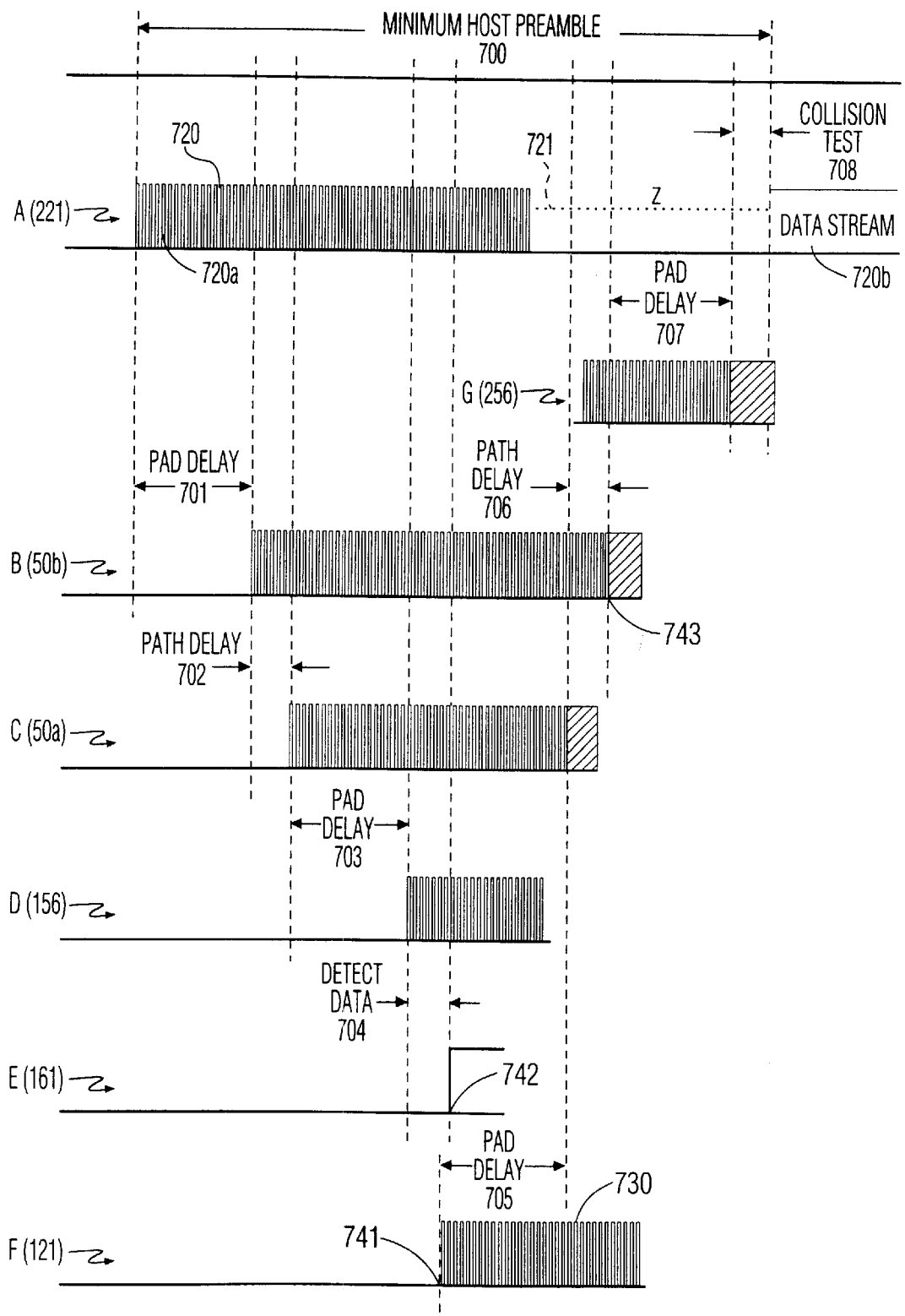
FIG. 6 illustrates example timing diagrams of a host transmission in accordance with one aspect of this invention.

The structure of the host preamble 311 and high-impedance state for the aforementioned embodiment can be readily understood with reference to the timing diagrams of FIG. 6. As noted above, the peripheral device 100 always wins a collision, but does not purposely cause a collision. That is, if the peripheral device 100 is receiving data from the host 200, the controller 190 prevents the transmitter 120 from transmitting until the host transmission is completed. In accordance with this aspect of the invention, the host preamble 720a serves to alert the peripheral 100 that data is forthcoming. The delay incurred in propagating the preamble 720a includes pad delay 701 to propagate the preamble 720a to the output of pad 250, plus path delay 702 across the communications path 50, plus the pad delay 703 to propagate the preamble 720a as the input of pad 150, plus the delay 704 required for the receiver 160 to detect the data contained in the preamble 720a. In a preferred embodiment, the initial portion of the host preamble 720a contains data that is formatted in the same form as the data in the data stream 720b, so that the same circuitry used to detect data from the data stream 720b is used to detect the data in the data stream 720a. As noted above, when the peripheral 100 receives data, the controller 190 prevents the transmitter 120 from transmitting until the host transmission is completed.

Illustrated on timing diagram F in FIG. 6 is a transmission 730 from the peripheral 100 that commences at 741, just prior to the detection of the received data from the host, at 742. In accordance with this invention, as discussed above, once a transmission is started from the peripheral 100 it continues until it is completed, and the host device 200 must back off. In accordance with this alternative aspect of this invention, once the host device 200 commences a transmission of the data stream 720b, after the preamble 720a, the transmission continues uninterrupted. Therefore, the preamble 720a in this preferred embodiment is of sufficient duration to detect a transmission 730 from the peripheral 100 that starts just prior to the detection of the preamble 720a at the peripheral 100, at 742. The transmission 730 incurs a pad delay 705 as it propagates to the output of the pad 150, plus the path delay 706 across the communications path 50, plus a pad delay 707 across the pad 250, plus the delay time 708 required to detect the propagated peripheral transmission 730 by the collision detector 280 of the host device 200. At the time 743 when the peripheral transmission 730 appears at the host end 50a of the communications path 50, the output pad 250 is in a high impedance state 721, so that the peripheral transmission 730 can be detected. As illustrated in the timing diagram A of FIG. 6, the preamble 720a enters a high-impedance (z) state 721 prior to the time 743 that the peripheral transmission 730 arrives. The pad 250 is brought to the high impedance state for at least one pad delay before the collision test signal is asserted to detect the transmission 730.

Using the nomenclature above with respect to the peripheral preamble delay, the minimum host preamble duration is:

$$D(700)=D(701)+D(702)+D(703)+D(704)+D(705)+D(706)+D(707)+D(708). \quad (5)$$

As noted above, in the environment of a high speed peripheral device 100 communicating with a host computer 200, the path delays D(702), D(706) are substantially less than the pad delays D(701), D(703), D(705), D(707), which are approximately equal to each other. As also noted above, the activity detector 630 in the collision detector 280 is similar to the detectors used to alert the peripheral that data is arriving. That is, the activity delay D(708) is typically the same as the data detect delay D(704). For ease of reference this delay duration D(704), D(708) is termed the detection delay. Thus, the host preamble duration is specified as:

Host Preamble Duration $\geq$ 4* Pad Delay+2* Detection Delay. (6)

Note that in this embodiment, the host preamble duration is also equal to the collision detection delay discussed above. Therefore, equation (4) above can be rewritten as:

Peripheral preamble duration $\geq$ 6* Pad delay+2* Detection Delay (4')

Note also that the activity detector 630 is typically a synchronous process, and, due to the asynchronous relationship between the host 200 and the peripheral 100, an additional detection delay duration may be required for those instances when the peripheral transmission arrives just after the start of activity detection cycle. Therefore, in a preferred embodiment, equation (4') is expressed as:

Peripheral preamble duration $\geq$ 6* Pad delay+3* Detection Delay (4'')

With current technology, typical pad delays of 3 nanoseconds are common, as are detection delays of 10 nanoseconds. Therefore, the minimum host and peripheral preamble durations in this technology are 32 and 48 nanoseconds, respectively. As would be evident to one of ordinary skill in the art, longer durations would be specified to account for specific environmental factors, such as path delays, temperature dependencies, component tolerances, and the like.

A transmission propagation delay can be defined as the time required for a transmission from a transmitter 120, 220 to be detected at a corresponding receiver 260, 160, respectively. Using this terminology, the transmission propagation delay is equal to two pad delays plus the path delay plus the detection delay, and equations (6) and (4″) can be restated as:

$$\text{Host preamble duration} \geq 2* \text{ Transmission propagation delay.} \quad (7)$$

$$\text{Peripheral preamble duration} \geq 3* \text{ Transmission propagation delay.} \quad (8)$$

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is particularly well suited for a single channel serial connection, the principles of this invention can be applied to one of a plurality of single channel connections that form a parallel connection. Similarly, although the invention is presented using a host-peripheral paradigm, the principles of this invention can be applied to alternative paradigms that share a communications path. For example, in a communications network, each device on the network may be programmable to operate as either a host device 200 or a peripheral device 100 in FIG. 1. When a device on the network requires substantially uninterrupted transmission access, for example, when providing a video or audio clip for immediate presentation, it can be programmed to operate as the collision-winning peripheral device 100; at other times, other devices can be allocated this collision-winning role.

The invention may be implemented in hardware, software, or a combination of both. For example, the collision detector 280 may be a program that periodically reads the logic value on the communications path 50 and compares it to the logic value of the data that it is transmitting. The functional partitionings presented in FIGS. 1, 4, and 5 are for illustrative purposes only. For example, the collision detection 280 may be integrated in the receiver 260, the transmitter 220, or the pad 250. Similarly, although the example circuits of FIGS. 4 and 5 are shown using bipolar and field effect transistors, alternative embodiments that effect the described functions would be evident to one of ordinary skill in the art.

I claim:

1. A communication system, comprising:
a first device comprising a first transmitter configured to transmit a first transmission on a single channel communications path without interruption;
a second device comprising a second transmitter configured to conditionally transmit a second transmission on the single channel communications path;
a collision detector that is configured to detect a collision when the first transmission from the first device occurs while the second transmitter is transmitting the second transmission; and
a controller, operably coupled to the second transmitter and the collision detector, that is configured to terminate the second transmission when the collision is detected;
wherein the first device continues the first transmission independent of the collision, wherein data comprising said first transmission are unaffected by said collision and wherein the first transmission includes a first preamble and a first data stream,
the first preamble having a first preamble duration that is at least as long as a summation of a transmission propagation delay between the first device and the second device, and a collision detector delay for the second device to detect the collision to assure that said second transmission is terminated before the first data stream is transmitted.

2. The communication system of claim 1, wherein
the second transmission includes a second preamble and a second data stream;
the second preamble having a second preamble duration that is at least as long as twice the transmission propagation delay between the first device and the second device; and
the collision detector is configured to detect the collision within the second preamble duration to assure that the second data stream is not transmitted before the collision detector determines a non-presence of a first transmission.

3. A communication system, comprising:
a first device comprising a first transmitter configured to transmit a first transmission on a single channel communications path without interruption;
a second device comprising a second transmitter configured to conditionally transmit a second transmission on the single channel communications path;
a collision detector that is configured to detect a collision when the first transmission from the first device occurs while the second transmitter is transmitting the second transmission; and
a controller, operably coupled to the second transmitter and the collision detector, that is configured to terminate the second transmission when the collision is detected;
wherein the first device continues the first transmission independent of the collision, wherein data comprising said first transmission are unaffected by said collision and wherein the second transmission includes a preamble and a data stream;
the preamble having a preamble duration that is at least as long as twice a transmission propagation delay between the first device and the second device; and
the collision detector is configured to detect the collision within the preamble duration to prevent one of the first and second device from transmitting during one of a first and second data stream, respectively, without first determining that said corresponding one of the first and the second devices is not transmitting.

4. The communication system of claim 3, wherein
the second transmission includes a preamble and a data stream, the preamble having a preamble duration that is at least as long as twice the transmission propagation delay between the first device and the second device, and
the collision detector is configured to detect the collision within the preamble duration, and to postpone any conditional transmission until it is determined that no detection occurred.

5. A peripheral device for use in a communication system that includes a host device that is configured to conditionally transmit a sequence of host transmissions on a single channel communications path, the peripheral device comprising:
- a receiver that is configured to detect an end of a first host transmission of the sequence of host transmissions on the single channel communications path; and
- a transmitter, operably coupled to the receiver, that is configured to commence a peripheral transmission on the single channel communications path after the end of the first host transmission, and continue the peripheral transmission independent of subsequent host transmissions of the sequence of host transmissions, wherein said host device forgoes attempts to continue transmitting said sequence of host transmissions until that time that said peripheral device ceases transmission, wherein the peripheral transmission includes a preamble and a data stream,
- the preamble having a preamble duration that is at least as long as a summation of a transmission propagation delay between the host device and the peripheral device, and a collision detection duration associated with the host device such that said peripheral device will not transmit until it is determined that said host device is not transmitting.

6. The peripheral device of claim 5, further including
- a data source, operably coupled to the transmitter, that is configured to provide data to form the data stream.

7. A method for controlling data flow between a first device and a second device on a single channel communications path, the method comprising the steps of:
- transmitting a first transmission on the single channel communications path from the first device, the first transmission having a first transmission duration;
- conditionally transmitting a second transmission on the single channel communications path from the second device, the second transmission having a second transmission duration;
- detecting a collision when the first transmission and the second transmission occur during a common time interval;
- terminating the second transmission within the second transmission duration when the collision is detected without interfering with the first transmission; and
- continuing the first transmission for the first transmission duration, wherein the second transmission includes a preamble and a data stream, the preamble having a preamble duration; and
- the collision is detected during the second transmission preamble duration during said common time interval such that transmission of said second transmission data stream is cancelled.

8. The method of claim 7, wherein the first transmission includes a first preamble and a first data stream,
- the first preamble having a first preamble duration that is at least three times a transmission propagation delay between the first device and the second device; and
- the second transmission includes a second preamble and a second data stream,
- the second preamble having a second preamble duration that is at least twice the transmission propagation delay, wherein said first transmission does occur until no second transmission is detected for a time period at least as large as the first preamble.

* * * * *